United States Patent
Miller, II et al.

(10) Patent No.: US 8,090,381 B2
(45) Date of Patent: Jan. 3, 2012

(54) PROTOCOL ASSISTED SWITCHED DIVERSITY OF ANTENNAS

(75) Inventors: Robert Raymond Miller, II, Convent Station, NJ (US); Matthew J. Sherman, Succasunna, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1019 days.

(21) Appl. No.: 09/989,779

(22) Filed: Nov. 20, 2001

(65) Prior Publication Data
US 2003/0096617 A1   May 22, 2003

(51) Int. Cl.
*H04W 72/04* (2009.01)

(52) U.S. Cl. ............ 455/452.2; 455/436; 455/101; 370/280

(58) Field of Classification Search ........... 455/452, 455/436, 101, 13.3, 452.1, 452.2, 561, 277.2, 455/136, 69, 277.1, 73; 370/389, 390, 437, 370/474, 280, 347; 375/267
See application file for complete search history.

(56) References Cited

U.S. PATENT DOCUMENTS

| | | | | |
|---|---|---|---|---|
| 5,787,122 | A * | 7/1998 | Suzuki | 375/267 |
| 6,363,062 | B1 * | 3/2002 | Aaronson et al. | 370/348 |
| 6,560,443 | B1 * | 5/2003 | Vaisanen et al. | 455/73 |
| 6,931,238 | B1 * | 8/2005 | Aizawa et al. | 455/101 |
| 7,043,218 | B1 * | 5/2006 | Ogino | 455/277.2 |
| 7,248,841 | B2 * | 7/2007 | Agee et al. | 455/101 |
| 2001/0024964 | A1 * | 9/2001 | Wang et al. | 455/562 |
| 2002/0068611 | A1 * | 6/2002 | Kogiantis et al. | 455/562 |
| 2002/0141355 | A1 * | 10/2002 | Struhsaker et al. | 370/280 |
| 2003/0012308 | A1 * | 1/2003 | Sampath et al. | 375/340 |
| 2007/0213062 | A1 * | 9/2007 | Medlock et al. | 455/436 |
| 2007/0298748 | A1 | 12/2007 | Banh et al. | |

FOREIGN PATENT DOCUMENTS

| | | | |
|---|---|---|---|
| EP | 0 740 430 | A2 | 10/1996 |
| EP | 0 740 430 | A3 | 10/1996 |
| EP | 000740430 | A2 * | 10/1996 |
| EP | 0740430 | A3 * | 1/1997 |

OTHER PUBLICATIONS

Ali Khayrallah, Improved TIm-Diveristy Mehods for Digital Cellular Telephone Receivers, Aug. 1999.*
Khayrallah, Ali, "Improved Time-Diversity Methods for Digital Cellular Telephone Receivers", Kenneth *Mason Publications*, Hampshire, GB, Aug. 1999, No. 424, p. 1024 (XP-000889044).
Office Action for CA 2,411,725, Jun. 25, 2008, pp. 1-4.

* cited by examiner

*Primary Examiner* — Kamran Afshar
*Assistant Examiner* — Khawar Iqbal

(57) ABSTRACT

Fading is countered in a WLAN or similar system to maintain QoS by a fusion of switched diversity and protocol based redundancy using time spaced transmission bursts to improve the performance of radio receivers. This redundancy may be enhanced by an overlay of space-time coding of the transmission bursts.

18 Claims, 2 Drawing Sheets

PROTOCOL ASSISTED SWITCHED DIVERSITY OF ANTENNAS

FIELD OF THE INVENTION

This invention relates to improving the reception of digital radio signals with reduced-complexity radio receivers, such as those which may be used with handheld multimedia communication devices in wireless LAN applications. It particularly relates to radio receivers with multiple antennas. In particular, the present invention uses a protocol assisted switched diversity antenna system.

BACKGROUND OF THE INVENTION

Wireless LANs (Local Area networks) differ from wired LANs in that various radio transmission channels may interfere with one another. Indeed signal propagation is further subject to many variations in signal strength due to such factors as multipathing a result of the various propagation paths a wireless signal may experience and other factors that interfere with a clean signal. Diversity is one means of dealing with these various effects.

Antenna spatial diversity is one of the most powerful techniques for improvement of radio channel quality. The technique assumes that radio signals arrive at antennas displaced in space via substantially different propagation paths when a multipath (Rayleigh) propagation environment is present. Thus, the signals arriving at each antenna are substantially decorrelated (provided large enough antenna spacing is used), and impairments which may affect each of them due to multipath fading are mostly non-overlapping in time and frequency. Using the two signals in combination, with an appropriate combining technique based on a quality metric (e.g. received signal strength), can allow better communication quality to be sustained.

In order to capitalize on the full value of antenna diversity, it is conventional to implement duplicate receivers for each antenna path. Although this "combinational" diversity approach is very effective, it can be costly and difficult to implement in a low power environment. A simpler approach, using a smaller number of receivers than the number of antennas is called "switched diversity". In these implementations, the receiver uses one of the antennas to recover the desired signal while monitoring the quality metric. If the quality metric falls below an acceptable level, an RF switch is actuated to connect the receiver instantaneously to a different antenna.

Usually switched diversity usage is relegated to analog transmission systems (e.g. analog cellular) or digital systems, which can accommodate retransmission of unacknowledged or negatively acknowledged messages. For systems in which the radio channel remains stationary for an acceptable interval, switched diversity may be applied using a large number of antennas. Conventional switched diversity systems, however, do not cooperate with MAC protocols since the switching of the antenna is autonomous at the receiver.

Wireless LANs are now being contemplated for delivery of time-bound multimedia communications in addition to their current use for non-time-bound data. Protocols have been developed for providing scheduled, non-conflicting time intervals for transmission of multimedia packets whose latency requirements cannot accommodate conventional retransmissions for error correction. Because delays caused by ack/nak-directed retransmission cannot be tolerated, one must seek other means to reduce error rate. Forward error correction coding is usually used for such purposes, but its use may incur large coding overheads in the case of multipath propagation environments where a significant number of symbols may be eliminated by a fade at a single antenna.

Although combinational diversity is an attractive means of reducing error rate in multipath environments, wireless LAN clients frequently require low dissipation and small (PCM-CIA) form factors, and are less able to support the complexity and cost of multiple receivers. Eventually, VLSI techniques will succeed in meeting the size, cost, and dissipation requirements for these clients. However, it would be advantageous to have a means by which the switched-diversity architectures in use for today's wireless LAN receivers could be utilized to provide the necessary improved BER performance in association with software-based protocol and coding techniques.

SUMMARY OF THE INVENTION

An exemplary diversity system involves use of a novel fusion of switched diversity with protocol-based transmission redundancy and error-correction coding to improve to improve the performance of radio receivers. A specific embodiment disclosed herein uses a single receiver which may be connected to more than one antenna via an RF switch. In contrast to conventional switched-diversity operation, the switch is controlled, not by signal strength or other metric, but rather incremented by the sequence number of a series of scheduled packet bursts which are prescribed by a QoS protocol. The message itself is recovered from the series of packet transmissions, each displaced in time. Each transmission may be coded in such a way as to provide a combination of error-correction coding and user data, providing a trade-off opportunity between radio resource use and error rate. An example of a coding scheme which may be utilized is space-time codes.

In one particular embodiment a receiver of a base station having two decorrelated antennas is enabled to operate with a fusion of switched diversity reception and protocol based redundancy using time spaced transmission bursts, each containing the same message, to improve the performance of radio receivers (i.e., including mobile receivers) in a WLAN. The protocol works with the antenna switching process to provide the best signal reception.

In another embodiment space-time codes are used to spread the message information over the two transmitted bursts separated in time within a PCF control frame such as defined in the WLAN 802.11 standard. This advantageously allows reduction of radio resource use as compared with the above redundant transmissions. The robustness of the operation is maintained.

These embodiments may include a capability of notifying a transmitting end from a receiving end of the transmission that a client receiver is capable of protocol assisted switched diversity operations, including the number of antennas and receivers available for reception.

In another aspect of the invention, where enough bursts have been received successfully to reconstruct the transmitted message (via check sum or other error detection technique), an option is given a receiving end of the system to acknowledge correct receipt of the message. A transmitting end to may use this acknowledgement to cause the transmitting part of the system to cease sending diversity bursts. This permits a significant conservation of system radio resources.

DETAILED DESCRIPTION

Figure 1:
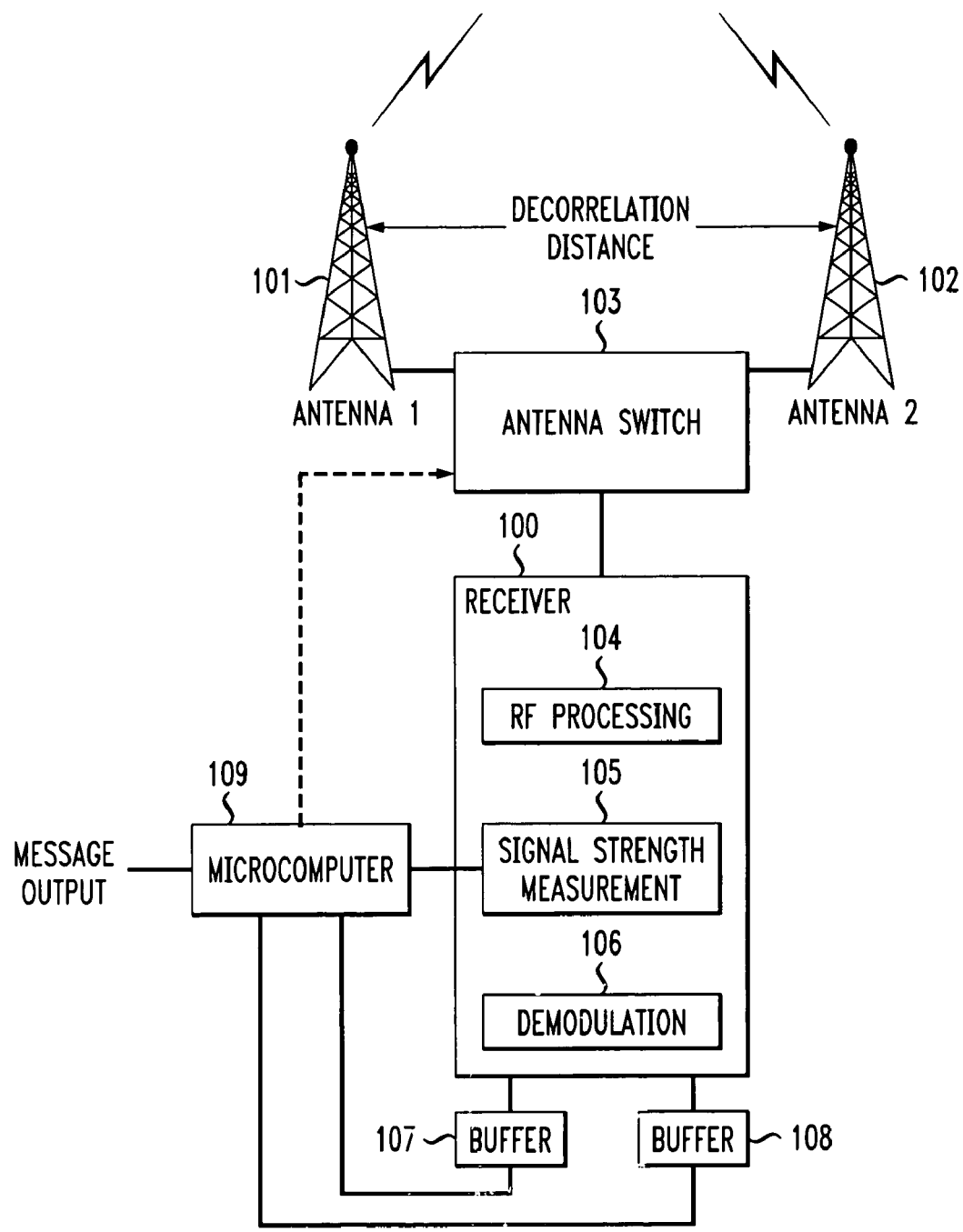
FIG. 1 is a schematic of an exemplary receiver using two antennas to achieve spatial diversity.

In an examplary two-antenna, one-receiver embodiment as shown in FIG. 1, receiver (100) is connected to antennas (101 and 102) by an RF switch (103). The receiver consists of a conventional analog RF processing (104), signal strength measurement (105) and digital demodulation (106) facilities. The digital output of the receiver, consisting of message symbols and associated signal strength values, is connected to a buffer memory arrays (107 and 108). Control of RF switch 103 is accomplished with the aid of microcomputer (109) which executes a stored program implementing the MAC protocol. Based on the state of the protocol, the RF switch control will be operated in the conventional mode (switching based on an RF signal strength quality metric as described above), or in the multiple burst mode (where it is switched to ensure that a particular burst is received by a particular antenna.

For the purposes of this example, the base station will be assumed to have at least combinational diversity reception, and may also support transmit diversity. In operation, the method works as follows: Operating in the conventional switched-diversity mode, the client receiver has acquired the RF channel and has selected an antenna which is delivering acceptable signal strength. By receiving the channel for a period of time, the receiver has allowed the MAC microprocessor to synchronize with the base station transmissions and to cooperate according to protocol rules for channel access. The MAC communicates to the base station that its hardware configuration supports switched-diversity QoS improvement as part of its session-access preamble, during which it requests a specific stream QoS type. Ordinarily, the switched-diversity QoS option would be engaged only for high-priority traffic in a priority-based scheduling system, or for the traffic requiring the highest end-to-end QoS performance in a parameter-based system. The balance of the example will assume that the "parameterized-QoS" mode is used (see FIG. 2).

Figure 2:
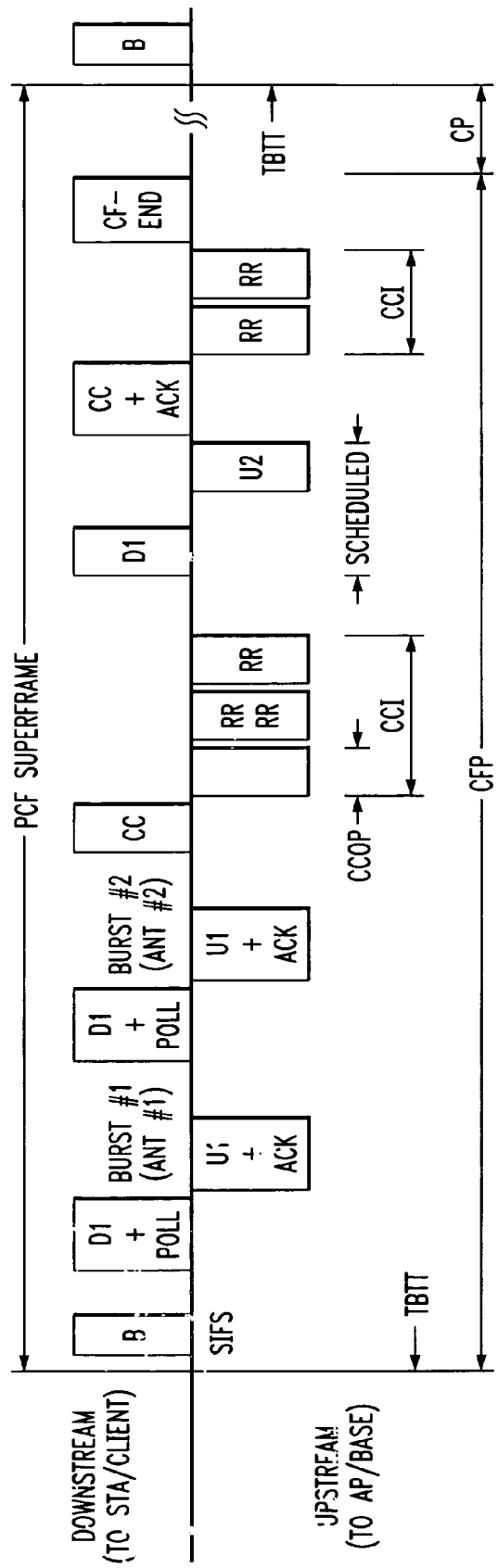
FIG. 2 is a graph of control protocol frames used in an exemplary transmission media.

The QoS mode illustrated in FIG. 2 uses a protocol set of a proposed 802.11e standard. In this protocol set, a station (STA/client) communicating with an access port (AP) may only use the wireless transmission medium during specified periods of time. These specified periods of time include Contention Free Periods (CFPs), Controlled Contention intervals (CCI) and Resource Reservation (RR) frames and Contention Control (CC) frames. A controller grants the transmission medium for use by RR frames by transmitting a CC frame. Only RR frames are transmitted during a time period specified by the CCI frame. The RR frames define the needed Bandwidth of the designated QoS. The CC frames designate parameter for the CCI. Further details of this procedure are contained in the 802.11 proposal of the IEEE.

When the base station determines that downlink (to the client) traffic has arrived from the network, it schedules a series of burst transmissions (in this example, two). The base station initiates message transmission by issuing a polling request, followed by the first packet burst. The first burst, containing the message, will be received exclusively on the antenna which has been in use (the RF switch remains set for the duration of the burst). While the burst is being received, the receiver's output (soft symbols and signal strength values) is stored sequentially in buffer 107. At the conclusion of the base station's transmission, the client transmits a polling response, followed by any uplink (to the base station) traffic it may have to send. The microprocessor, which has been adhering the protocol, immediately causes the RF switch to connect the alternate antenna to the receiver, in preparation for reception of the second burst, containing the same message. At some later moment in the current superframe or a subsequent superframe, the base station transmits a second polling request and the second packet burst. This burst is received exclusively using the second antenna; the receiver output is similarly stored sequentially in buffer 108.

Following receipt of the second burst, the microcomputer extracts the first symbol of the first burst from buffer 107 with its corresponding signal strength value. Likewise, it extracts the first symbol of the second burst from buffer 108, with its corresponding signal strength value. Using a combination of symbol decoding, error correction decoding, and combining based on the signal strength metric, the desired message is extracted. Techniques such as Maximal Ratio Combining (MRC), well known to those skilled in the art, could be used for this purpose.

Since the method uses implicit time-displaced redundancy in cooperation with antenna diversity, the quality of the recovered message is comparable to conventional combinational diversity if the channel is stationary during the interval which includes both bursts and the bursts contain exactly the same information. If the channel is not stationary over this interval, the method produces a form of space-time spreading, which may provide improvement over combinational diversity methods.

Using identical (duplicated) transmission in the bursts uses twice the radio resource than would be required with a combinational diversity system. For time-bound (fixed duration) material which uses relatively short packets (e.g. digital voice), this increase in resource usage would undoubtedly be an acceptable trade-off for increased quality and hardware simplicity. For high throughput (large packet) traffic, total redundancy of packets may constitute unacceptable overhead. Accordingly, by use of appropriate coding techniques (e.g. space-time codes) it is possible to trade off quality improvement for radio resource usage by partially or completely spreading the message across the bursts. Such a strategy allows flexibility between BER improvement and channel occupancy. Space-time codes may be used for improving performance in a wireless environment and when combined with protocol switched diversity significantly improves transmission efficiency over that of the protocol switched diversity alone.

Additions to the invention may include adding an ability of the system to communicate from a terminating end to a transmitter to specify the receiver capability to perform protocol assisted diversity operation and include the number of antennas and radio receivers that the terminating end has.

In another arrangement, the receiving end may notify a transmitting end promptly if a message is successfully received, allowing reconstructing of the transmitted message, before a subsequent burst is received. This allows action to cease further transmission of bursts related to this particular message thereby resulting in a conserving of radio resources in the system.

Those skilled in the art may devise many variations of these schemes without departing from the spirit and scope of the invention. A hybrid architecture consisting of switched-diversity and combinational diversity elements may be used (e.g. four antennas, a 4×4 switch matrix, and two receivers) to provide significantly improved performance over conventional two-branch combinational diversity.

What is claimed is:

1. A radio receiver comprising:
first and second antennas connected to a radio frequency processing circuitry by a radio frequency switch; and
a radio frequency switch control in communication with the radio frequency switch, wherein the radio frequency switch control is a media access control processor that is synchronized with transmission of a base station, the radio frequency switch control for switching between the first and second antennas in response to a predefined schedule of a sequence of scheduled packet bursts, wherein the sequence of scheduled packet bursts is prescribed by a quality of service defined by a media access control protocol, wherein the predefined schedule is scheduled by the base station, wherein the sequence of scheduled packet bursts comprises a first signal burst received via the first antenna and a second signal burst received via the second antenna after the first signal burst, wherein the first signal burst and the second signal burst comprise identical packets of a common message, wherein an output of the radio receiver associated with the first signal burst is stored in a first buffer and an output of the radio receiver associated with the second signal burst is stored in a second buffer and wherein a representation of the common message is extracted by using a first symbol from the first buffer and a first symbol from the second buffer.

2. The radio receiver of claim 1, wherein:
the first and second antennas are switched so that each antenna receives a related packet burst.

3. A method of maintaining a controlled quality of service in a wireless communication system, comprising:
receiving by wireless transceivers scheduled communications from a transceiver at a transmission station in accordance with a predefined schedule of a sequence of scheduled packet bursts, wherein the sequence of scheduled packet bursts is prescribed by a quality of service defined by a media access control protocol, wherein the wireless transceivers are located at receiving stations having switched protocol diversity reception operational modes, wherein the predefined schedule is scheduled by the transmission station to switch between a first antenna and a second antenna;
enabling the first antenna to receive a first packet burst in accordance with the predefined schedule;
enabling the second antenna to receive a second packet burst after the first packet burst in accordance with the predefined schedule, wherein the first packet burst and the second packet burst comprise identical packets of a common message;
storing an output associated with the first packet burst in a first buffer;
storing an output associated with the second packet burst in a second buffer; and
processing a first symbol from the first buffer associated with the first packet burst and a first symbol from the second buffer associated with the second packet burst into a representation of the common message.

4. The method of claim 3 wherein:
each packet burst contains a same complete message.

5. The method of claim 3 wherein:
each packet burst contains a portion of a space-time coded message spread across the first and second packet bursts.

6. A method of achieving a quality of service control in a wireless local area network communication system, comprising:
transmitting a message contained within a plurality of packet bursts occurring at spaced time intervals, wherein a first packet burst and a second packet burst of the plurality of packet bursts comprise identical packets of a common message;
receiving a first one of the packet bursts at a first antenna; and
receiving a second one of the packet bursts at a second antenna after the first one of the packet bursts in accordance with a predefined schedule, wherein the predefined schedule is prescribed by a quality of service defined by a media access control protocol, where the predefined schedule is scheduled by a base station and is used to select one of the first antenna and second antenna for receiving each of the packet bursts, wherein an output of a radio receiver associated with the first one of the packet bursts is stored in a first buffer and an output of the radio receiver associated with the second one of the packet bursts is stored in a second buffer and wherein a representation of the common message is extracted by using a first symbol from the first buffer and a first symbol from the second buffer.

7. The method of claim 6 wherein;
the first antenna and the second antenna are connected to the radio receiver at separate times relative to other antennas.

8. The method of claim 6, wherein:
including a complete message within each packet burst.

9. The method of claim 6 wherein:
the common message is spread across the plurality of packet bursts by space-time coding.

10. The method of claim 6 wherein:
the transmitting combines a protocol with signal processing.

11. The method of claim 6, further including:
notifying a transmitter at a transmitting end by a receiving end of a number of antennas and radio receivers at the receiving end.

12. The method of claim 6, further including:
a receiver notifying a transmitter that the receiver accepts and responds to protocol-assisted diversity operations.

13. The method of claim 6, further including:
upon extraction of the representation of the common message sending a message to a transmitting end to cease further message bursts.

14. A communication system, comprising:
a radio frequency switch control in communication with a radio frequency switch, wherein the radio frequency switch control is a media access control processor that is synchronized with transmission of a base station;
a transmitter; and
a receiver coupled to the transmitter, wherein the receiver is adapted for receiving a first signal burst by a first antenna and a second signal burst after the first signal burst by a second antenna and responding to the two signal bursts to communicate a single unified message at the receiver, wherein the first and second signal bursts are sequentially separated in time in accordance with a predefined schedule, wherein the first and second signal bursts are prescribed by a quality of service defined by a media access control protocol, wherein the predefined schedule is scheduled by the base station, wherein the first signal burst and the second signal burst comprise identical packets of the single unified message, wherein the first and second antennas are sequentially enabled in accordance with the predefined schedule to communicate with a first buffer and a second buffer at the receiver and a representation of the single unified message is extracted by using a first symbol from the first buffer and a first symbol from the second buffer.

15. The communication system of claim 14, wherein:
the first and second signal bursts are each part of a space-time coded message spread across two bursts; and
the representation of the single unified message is derived from the sequential signal bursts received by the first and second antennas.

16. The communication system of claim 15, wherein:
the deriving the representation of the single unified message includes selecting a message from one of the first and second antennas.

17. The communication system of claim 15, wherein:
the deriving the representation of the single unified message includes decoding a space-time coded signal spread across and received by both the first and second antennas.

18. The communication system of claim 14, wherein:
the first signal burst is stored in the first buffer and the second signal bursts is stored in the second buffer and the first signal burst and the second signal burst are processed to deliver the single unified message.

* * * * *